United States Patent
Bartsch

(10) Patent No.: US 10,063,061 B2
(45) Date of Patent: Aug. 28, 2018

(54) METHOD FOR FEEDING ELECTRIC POWER INTO AN ELECTRIC SUPPLY NETWORK

(71) Applicant: Wobben Properties GmbH, Aurich (DE)

(72) Inventor: Matthias Bartsch, Bremen (DE)

(73) Assignee: Wobben Properties GmbH, Aurich (DE)

(*) Notice: Subject to any disclaimer, the term of this patent is extended or adjusted under 35 U.S.C. 154(b) by 218 days.

(21) Appl. No.: 14/897,613

(22) PCT Filed: Jun. 10, 2014

(86) PCT No.: PCT/EP2014/062033
§ 371 (c)(1),
(2) Date: Dec. 10, 2015

(87) PCT Pub. No.: WO2014/198725
PCT Pub. Date: Dec. 18, 2014

(65) Prior Publication Data
US 2016/0134121 A1 May 12, 2016

(30) Foreign Application Priority Data
Jun. 10, 2013 (DE) .......................... 10 2013 210 812

(51) Int. Cl.
*H02J 1/10* (2006.01)
*H02J 3/38* (2006.01)
(Continued)

(52) U.S. Cl.
CPC ............ *H02J 3/386* (2013.01); *F03D 7/0284* (2013.01); *F03D 7/047* (2013.01); *F03D 7/048* (2013.01);
(Continued)

(58) Field of Classification Search
CPC ...... F03D 7/02484; F03D 7/047; F03D 7/048; F05B 2270/10711; H02J 3/386; Y02E 10/74
See application file for complete search history.

(56) References Cited

U.S. PATENT DOCUMENTS

| 4,916,377 A | 4/1990 | Terada et al. |
| 6,965,174 B2 | 11/2005 | Wobben |

(Continued)

FOREIGN PATENT DOCUMENTS

| CN | 101598110 A | 12/2009 |
| CN | 101929439 A | 12/2010 |

(Continued)

*Primary Examiner* — Jared Fureman
*Assistant Examiner* — Esayas Yeshaw
(74) *Attorney, Agent, or Firm* — Seed IP Law Group LLP

(57) ABSTRACT

A method for feeding electric power into an electric supply network by means of a wind park comprising several wind turbines. The method comprises the steps of
- feeding the electric power at a network connection point,
- recording at least one network state parameter at the network connection point by means of a park control unit,
- checking the supply network for the presence of a transient process and
- sending, and/or sending at an increased clock rate, the values measured by the park control unit and/or the control values determined by the park control unit to the wind turbines, once the presence of a transient process has been detected.

14 Claims, 2 Drawing Sheets

(51) Int. Cl.
  *H02J 7/34* (2006.01)
  *F03D 7/02* (2006.01)
  *F03D 7/04* (2006.01)

(52) U.S. Cl.
  CPC ... *F05B 2270/10711* (2013.01); *Y02E 10/721* (2013.01); *Y02E 10/723* (2013.01)

(56) References Cited

U.S. PATENT DOCUMENTS

| | | | | |
|---|---|---|---|---|
| 7,462,946 | B2* | 12/2008 | Wobben | F03D 7/0284 |
| | | | | 290/44 |
| 7,679,208 | B1* | 3/2010 | Ko | F03D 7/0224 |
| | | | | 290/44 |
| 7,939,970 | B1* | 5/2011 | Walling | F03D 7/0284 |
| | | | | 290/44 |
| 8,230,266 | B2 | 7/2012 | Hamby et al. | |
| 8,588,987 | B2 | 11/2013 | Riesberg et al. | |
| 8,766,480 | B2 | 7/2014 | Hiller et al. | |
| 9,018,782 | B2* | 4/2015 | Couchman | F03D 7/028 |
| | | | | 290/44 |
| 9,328,718 | B2* | 5/2016 | Nielsen | F03D 7/048 |
| 9,344,025 | B2 | 5/2016 | Bluhm et al. | |
| 9,362,837 | B2 | 6/2016 | Diedrichs et al. | |
| 2006/0142899 | A1* | 6/2006 | Wobben | F03D 7/0272 |
| | | | | 700/286 |
| 2009/0160187 | A1* | 6/2009 | Scholte-Wassink | |
| | | | | F03D 7/0284 |
| | | | | 290/44 |
| 2009/0317250 | A1* | 12/2009 | Gamble | F03D 1/0658 |
| | | | | 416/1 |
| 2010/0002475 | A1* | 1/2010 | Folts | H02J 9/062 |
| | | | | 363/37 |
| 2010/0332040 | A1 | 12/2010 | Garcia | |
| 2012/0061959 | A1* | 3/2012 | Yasugi | H02P 9/10 |
| | | | | 290/44 |
| 2012/0139499 | A1 | 6/2012 | Tanaka et al. | |
| 2012/0169059 | A1 | 7/2012 | Beekmann et al. | |
| 2012/0248772 | A1* | 10/2012 | Shigemizu | H02P 9/04 |
| | | | | 290/44 |
| 2013/0026763 | A1 | 1/2013 | Chern et al. | |
| 2013/0043690 | A1 | 2/2013 | Wilson et al. | |
| 2013/0328309 | A1 | 12/2013 | Fujii et al. | |
| 2014/0062086 | A1* | 3/2014 | Mata Dumenjo | H02J 3/1842 |
| | | | | 290/44 |
| 2015/0275862 | A1* | 10/2015 | Babazadeh | F03D 9/257 |
| | | | | 290/44 |

FOREIGN PATENT DOCUMENTS

| | | |
|---|---|---|
| CN | 101938137 A | 1/2011 |
| CN | 103140671 A | 6/2013 |
| DE | 19756777 A1 | 7/1999 |
| DE | 102009031017 A1 | 2/2011 |
| EP | 2131038 A2 | 9/2009 |
| EP | 2267302 A2 | 12/2010 |
| EP | 2267306 A2 | 12/2010 |
| JP | 64-81623 A | 3/1989 |
| JP | 2002-218654 A | 8/2002 |
| JP | 2006-333625 A | 12/2006 |
| JP | 2010-183759 A | 8/2010 |
| RU | 2221165 C2 | 1/2004 |
| RU | 2459112 C1 | 8/2012 |
| TW | 201112572 A | 4/2011 |
| TW | 201305768 A | 2/2013 |
| TW | 201308860 A | 2/2013 |
| WO | 2011073670 A2 | 6/2011 |
| WO | 2012089699 A2 | 7/2012 |
| WO | 2013/057028 A1 | 4/2013 |

* cited by examiner

METHOD FOR FEEDING ELECTRIC POWER INTO AN ELECTRIC SUPPLY NETWORK

BACKGROUND

Technical Field

The present invention relates to a method for feeding electric power into an electric supply network by means of a wind park. The present invention moreover relates to a corresponding wind park.

Description of the Related Art

The feeding of electric power by means of a wind park comprising several wind turbines is a matter of common knowledge. Here, several wind turbines of a wind park are combined in terms of their function, and they feed into the electric supply network through, in particular, a common network feeding point, also referred to as network connection point or PCC (point of common coupling). The wind park has often a park control or park control unit, which realizes common tasks for the wind park. This may include, for example, transmitting information between a network operator and a wind turbine or implementing an external power parameter for the active power to be fed in.

What is furthermore known today is that wind turbines, including wind parks, participate actively in the so-called network support of the respective electric supply network. This includes contributing to stabilizing the voltage within the electric supply network. This also includes taking stabilizing measures in the event of a system incident, such as a network short circuit. Often, such properties of the wind park or wind turbines are specified in the interconnection rules of the operator of the electric supply network (network operator) and may have to be evidenced by the operators of the wind park or wind turbines.

A park control is shown, for example, in U.S. application U.S. 2006 0142899 A1. Network support methods are described, for example, in DE 197 56 777, U.S. Pat. No. 6,965,174 and U.S. Pat. No. 7,462,946.

The power fed in at the network connection point, and thus the energy fed in at the network connection point—or, more precisely, the phase currents fed in—consist of the currents generated by the individual wind turbines. It is hence the wind turbines that generate and provide, by amount and phase, the respective currents and thus the fed-in total current. With modern wind turbines, this is done by using one or more frequency inverters. This means that the wind turbines also take the respective network stabilization and network support measures. What is difficult here, in particular, is to have the wind turbines, in particular the wind parks, meet the increasing demands on network support. It can also be difficult to prove the required network support property.

What can be particularly difficult is the quick implementation of a network support measure in the event of a voltage drop. Here, it is difficult to quickly determine a system incident, in particular a drop in line voltage, and to quickly take network support measures in the event of a corresponding system incident. Suggestions for a quick measurement were already described in U.S. 20120169059 A1. This already makes it possible to very quickly determine a state of the network and record, in particular, the line voltage. Nevertheless, it can remain difficult to quickly take measures in case of a system incident.

BRIEF SUMMARY

One or more embodiments provide a high-quality network support and/or fast-response network support. In accordance with one embodiment of the invention, a method based on a wind park comprising several wind turbines. Said wind park feeds into an electric supply network, namely at a network connection point where at least one network condition parameter is determined by means of a park control unit. Such state variable is, in particular, the electrical line voltage at the network connection point. The proposed method can be basically also used for an individual wind turbine that feeds into the electric supply network.

The supply network is moreover also checked for whether a transient process is present in the network. The electric supply network will normally, and thus when stationary, show an approximately sinusoidal voltage with fixed frequency and fixed amplitude. Both the frequency and the amplitude may vary within very tight limits without ever leaving the criterion of normal state. There may be also minor deviations from the sinusoidal course, in particular symmetrical and non-symmetrical harmonics. Here, the effective value of the voltage may suffice as the voltage amplitude. Often, it may also suffice to use only the voltage of one phase.

We are speaking of a transient process if the voltage deviates significantly from the above-described normal state, for example if its drops to a value of less than 90 percent of its rated value. A transient process thus specifies a significant departure from the normal, sinusoidal voltage curve. This also includes a change in respect of such state deviating from the normal sinusoidal voltage curve. A particular example of such a transient process is a drop in the line voltage due to a short circuit in the network. As a result, the voltage may suddenly drop to zero. The voltage may, however, also drop only in part. We are speaking of such partial drop, in particular, if the voltage drops to zero directly at the site of the short circuit, while the affected supply network is kept in operation so that a voltage can be maintained at other points of the supply network that are far away from the site of the short circuit. However, a fast voltage drop may exist in any event even if the voltage at the point observed does not drop to zero.

In this respect, a transient process means also a non-stationary state in the supply network, and this is also why such a process is referred to as transient process.

If a transient process is identified, the values measured by the park control unit are transmitted to the individual wind turbines. According to that, measured values, in particular of the electrical voltage in the supply network at the network connection point, are not initially transmitted to the individual wind turbines; they are transmitted only after a transient process has been identified. This means that the wind turbines can essentially operate independently in normal state as long as no transient process is identified—in any event more independently than once a transient process has been identified.

As an alternative, the recorded measured values, which are averaged or calculated in particular to actual values, are transmitted by the park control unit to the individual wind turbines also in normal state, but they are transmitted at a slower clock rate, for example at one value per second. If a transient process is identified, the transmission clock rate is significantly increased, for example to 20 milliseconds (ms)—i.e., one value or value package every 20 ms. In case of a 50 Hz network, such value equals a value or value package for each cycle.

This means that when a transient process is identified, the wind turbines will receive their values directly from the network connection point and, in particular, at a very high clock rate, and they can thus adapt their control to the required network support. The transmission of the values from the network connection point also ensures that all wind turbines at the respective wind park receive the same values. This enables a very close coordination of the wind turbines among each other.

Measured values with a low clock rate include, in particular, such that are calculated, for example by monitoring the network's state. They hence differ from measured values with a higher clock rate, which may be also referred to as sampled measured values and which have a clock rate or, respectively, sampling rate when related to recording of at least 1 kHz, preferably 5 kHz.

Both the recording of measured values and the proposed transmission of measured values and the determination and transmission of control values, as described hereinafter, may take place at a high or low clock rate, unless explicitly proposed otherwise by a concrete embodiment.

It is moreover proposed in addition, or in the alternative, for the park control unit to directly transmit control values to the individual wind turbines, in particular set point values that are to be set. Coordinated control is an option especially for network-support measures, which can be thus taken and performed quite easily by the park control unit. Here, the park control unit does not even have to have its own frequency inverters or similar systems to coordinate and feed current into the electric supply network. It achieves such coordinated control simply by controlling the respective systems of the wind turbines. Preferably, the park control unit records the details of the current feed-in at the network connection point, in particular the amount and phase of the fed-in current, namely of the fed-in total current of the wind park.

According to one embodiment, it is thus proposed to record the electrical voltage of the supply network as the network state parameter at the network connection point, and to record the phase angle of at least one fed-in current and/or the fed-in reactive power. In addition or alternatively, one may also record the amount of the fed-in current, and one may determine the reactive power based on the amount and phase of the fed-in current, taking into account the electrical voltage. By recording and possibly providing such central measured values at the network connection point, one may coordinate the feeding of the wind park by means of the wind turbines of the wind park. Moreover, this may altogether improve—or enable—verifiability of the wind park's feed-in properties.

Preferably, the phase of the current to be fed in is transmitted as a control value to the individual wind turbines. This way, one can influence the total current to be fed in, in particular the reactive current to be fed in.

According to one embodiment, it is proposed to individualize for each of the wind turbines the control values transmitted to the wind turbines. The park control unit, which has been initially provided especially with a value for the line voltage and with total values of the fed-in power and fed-in reactive power, may initially determine target values for the total reactive power to be fed in and/or the total reactive current to be fed in. Said total values may then be distributed among the individual wind turbines. An individual target value can then be calculated for the individual wind turbines based thereon or based on other values, and such individual target value can then be transmitted to the respective wind turbine. To this end, the park control unit may consider the total target values and knowledge of the individual wind turbines at the wind park. If and in as far as all wind turbines are identical and in operation at the wind park, the wind turbines may receive the same value. If a wind park comprises different wind turbines, it is possible to consider such differences, in particular differences in terms of their nominal power. The control values are individualized to this end. It may be advantageous and sufficient to individualize such control values only in groups, especially when a wind park comprises groups of identical or essentially identical wind turbines. In that case, each wind turbine belonging to a group of wind turbines will receive the same control values as the other wind turbines of that group.

Here, the control values provide, in particular, one reactive current target value of one reactive current to be fed in. The sum of the reactive current target values of all wind turbines provides a total reactive current target value indicating the amount of reactive current to be fed in at the network connection point. The respective reactive current target value of a wind turbine, which is provided as the control value by the park control unit, depends on the current feed-in capacity of the respective wind turbine and of the total reactive current target value of the network connection point.

According to one embodiment, it is proposed in this respect that each wind turbine should feature several feed-in units that may be designed, in particular, as power cabinets. Said feed-in units generate one current each to be fed into the electric supply network, and they may be designed as, or feature, inverters. Preferably, each feed-in unit is of the same size in terms of its feed-in capacity, in particular in terms of the current that it can generate and feed in, in particular as compared to other wind turbines at the wind park—even if the wind turbines differ in size. Thus, what is proposed and taken as a basis here is a concept where different feed-in capacity is realized through a different number of inverters. With regard to the individual wind turbines, the individualized reactive current or other current to the fed in is preferably calculated and specified based on the respective number of its existing feed-in units, i.e., based on the number of its inverter units.

The park control unit is aware of the number of each wind turbine's feed-in units and can calculate the individualized control values accordingly.

According to yet another embodiment, it is proposed to calculate the reactive current target value and/or an active power set point of each wind turbine or of each group of wind turbines based on the nominal active power and/or the nominal active current of the respective wind turbine, and to transmit it accordingly to the wind turbines. Preferably, only the feed-in units and/or only the wind turbines that are currently in operation or ready for operation will be considered.

Thus, the respective nominal active powers or nominal active currents represent the capacity that can be fed in. The sum of all nominal active powers or nominal active currents of the wind turbines currently in operation thus also reflects the active power capacity or active current capacity that can be made available overall by the wind park if there is enough wind.

Consideration of the nominal current provides a measure of how much current can be actually fed in in each case. The configuration of the wind turbines, of their individual feed-in units and/or existing lines is based on such nominal current and/or can limit such nominal current. Even if there is little wind, it may be possible to feed in a lot of reactive power—often even more than the active power. Although it is correct that only little active current can be generated if there is little wind, it may, however, be possible to generate more reactive current. The total current and thus also the reactive current is, however, limited by the technical design of the wind turbines, in particular of the feed-in units and/or connection lines. It is thus proposed to consider this, which may be done by considering the respective nominal current.

According to one embodiment, it is proposed that the control values ($i_{QS1}$, $i_{QS2}$, $i_{QS3}$) transmitted to the wind turbines (4) should be different from phase to phase, include an unbalance factor and/or be specified via a positive sequence component and a negative sequence component, with the transmitted control values each specifying, in particular, one reactive current target value ($i_{QS1}$, $i_{QS2}$, $i_{QS3}$) of a reactive current to be fed in.

One or more embodiments of the invention is thus based on a common three-phase system, and it is considered that asymmetries may occur between the phases. Said asymmetries are also considered for the control values that are to be transmitted. Several options are proposed to this end, including the option of applying the method of symmetrical components and specifying the control values accordingly through a positive sequence component and a negative sequence component. What is specified, in particular, are target values for a reactive current that is to be fed in.

A transient process is preferably identified by the fact that the line voltage drops below a predetermined voltage limit, the line voltage exceeds a predetermined upper voltage limit, the line voltage changes with a time gradient, which in terms of its value exceeds the modification limit and/or a difference of the line voltage is weighted by a reference value and the time gradient of the line voltage is weighted and added up to an overall criterion, which in terms of absolute figures or value exceeds an overall limit.

If the line voltage drops below a predetermined voltage limit, which may be, for example, 90 percent of the nominal voltage of the electric supply network, a drop in voltage and hence a transient process is recognized. An additional or alternative option is to record a slew rate of the line voltage. To this end, it is proposed to monitor the time gradient of the line voltage accordingly, i.e., at what gradient relating to time the line voltage changes. What is recorded here, in particular, is a drop in voltage—i.e., a negative slope and thus a negative gradient—which in terms of value is compared with a modification limit. Such a modification limit may be, for example, one volt per millisecond (ms), or it may be based on a standardized value, such as a gradient of one percent per second, with a voltage of 100 percent corresponding to the nominal voltage of the electric supply network. This way, it may be possible to recognize a voltage drop or other disturbance in case of a gradient that is large in terms of value, before the voltage was significantly changed in terms of its absolute value.

A disturbance in the electric supply network may be caused not only by a voltage drop but also by a strong voltage superelevation. Accordingly, it is proposed to record even such voltage superelevation as a transient process. A strong voltage superelevation exists, in particular, when the current line voltage exceeds the normal line voltage, in particular the nominal voltage of the electric supply network, by more than 10%, i.e., if it is greater than 110%.

Preferably, it is proposed to observe both the line voltage in terms of its absolute value and the gradient of the voltage. This may be considered by observing a voltage difference between line voltage and a reference value, on the one hand, and the time gradient of the line voltage, on the other. Said voltage difference and the gradient are both weighted and added up, possibly in terms of value. Normally, the two weightings will differ and they may also consider the different units of absolute voltage, on the one hand, and the different units of the voltage gradient, on the other. Preferably, the two weightings are selected such that the weighted values are unitless.

This also negates the identification of a transient process, if, for example, the line voltage is below a reference value while the voltage gradient indicates that said voltage is again rising.

According to one embodiment, it is proposed to switch from a stationary to a transient control if a transient process was identified in the supply network, and/or to switch from a transient control back to a stationary control if it was recognized that a transient process has ended. It is thus proposed to use a basically different control, namely—in particular—basically a park control, depending on whether or not a transient process exists.

In case of a stationary control, it is proposed to not provide each wind turbine with any default values for the reactive current to be fed in and/or any default values for a phase angle to be set. This means that the wind turbines of the wind park will essentially act more independently with a stationary control.

In case of a stationary control, one embodiment provides that measured voltage values that have been recorded by the park control at the network connection point should be transmitted to the wind turbine as a mean value with a first clock rate, or that such measured voltage values should not be transmitted at all to the wind turbines but that the wind turbines should instead use own measured values. The proposed first clock rate is a comparatively low clock rate, which may be, for example, one millisecond (ms).

In case of a transient control, it is proposed to provide each wind turbine with default values for the reactive current to be fed in and/or for a phase angle to be set. This means a very clear and drastic interference with the independence of the regulation or, respectively, control of the individual wind turbines. So far, the wind turbines have not only independently adjusted but also independently determined the phase angle that is necessary from time to time. According to this embodiment, this is to no longer take place in case of a transient control, i.e., a control that is used when a transient process was identified. In case of a transient control, which suggests, in particular, a voltage drop that has been caused by a network short circuit or the like, it is particularly advantageous if the wind park acts quickly, purposefully and in a manner that is preferably clearly reproducible and well-defined, as identified and realized in the present case. By having the park control unit provide the target values, the wind turbines are coordinated in a targeted manner when the supply network is in such a difficult and sensitive state.

In case of transient control, measured voltage values at the network connection point are preferably determined and transmitted to the wind turbines as instantaneous values or quasi-instantaneous values. The real-time recording and utilization of an instantaneous value is not possible physically, but it is possible to use fast measured values, which are not, in particular, assigned over several periods in the network average but only to the respective current period. From a practical point of view, they are instantaneous values—at least quasi-instantaneous values. One possibility of recording such measured values is described, for example, in patent application DE 10 2009 031 017 or, respectively, U.S. 2012 0169059 A1, and the use of a method described therein for recording measured values, in particular the voltage in a three-phase voltage network is proposed herein, as well. In this respect, the subject matter of said patent application is to be considered part of the present description.

In addition or alternatively, it is proposed to transmit to the wind turbines such measured voltage values with a second clock rate that is increased over the first clock rate. This way, the wind turbines receive very quickly and, moreover, simultaneously the current value of the electrical voltage of the electric supply network at the network connection point. The second clock rate is selected so high that the respective values are transmitted to the wind turbines so quickly and with quick adaptation that a corresponding network support can be performed at the necessary speed in the difficult and quickly changing event of a voltage drop, in particular of a network short circuit.

Preferably, the wind park is controlled such that a minimum total active power to be fed in is not undercut based on the total reactive power at the network connection point fed in or to be fed in at the network connection point. Here, one can achieve minimum power feeding to be ensured even in case of short-circuit current feeding. Such minimum active power may depend on the active power fed in or to be fed in.

Another embodiment proposes to notify the detection of a transient process to a network control center that controls the electric supply network. This way, one can have the network control center be notified of such transient process, i.e., of the system incident. Moreover, such notification of the network control center also implies that a corresponding behavior of the wind park is to be expected now, or, respectively, that the network control center will be able to understand the behavior of the wind park.

Preferably, it is proposed that at least one status variable at the network connection point, in particular the line voltage, be measured there continuously and at an undiminished clock rate. It is, however, proposed that such measured network state parameter be transmitted to the wind turbine only if a transient process is detected, or that such transmission takes place at an as high as possible clock rate at least only in the event of a transient process, in particular at the clock rate at which the respective network state parameters are measured.

This way, one can achieve that a network control be recorded at high speed, namely with as little as possible delay. However, the recording of a system incident should be a great exception and it is therefore proposed to transmit the respective data, or to transmit it at an undiminished clock rate and as quickly as possible, only once a transient process—i.e., a disturbance in the network—has been actually identified.

What is moreover proposed according to an embodiment of the invention is a wind park that is prepared for feeding electric power into an electric supply network at a network connection point. Such wind park comprises several wind turbines and one park control unit. The wind park, in particular its park control unit, is prepared for performing a method according to at least one of the above-described embodiments.

BRIEF DESCRIPTION OF THE SEVERAL VIEWS OF THE DRAWINGS

The invention is described in more detail below based on exemplary embodiments, with reference to the accompanying figures.

DETAILED DESCRIPTION

Figure 1:
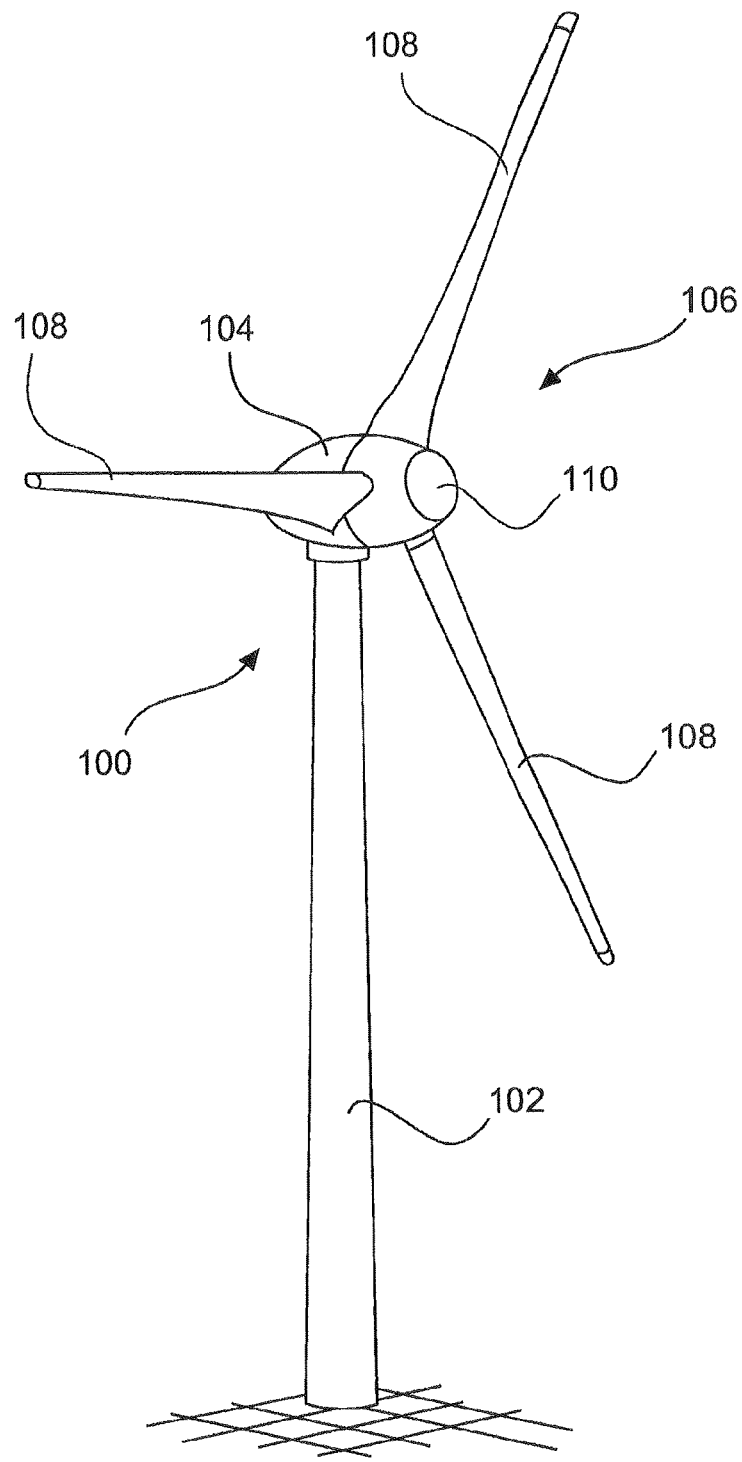
FIG. 1 shows a perspective view of a wind turbine.

FIG. 1 shows a wind turbine 100 having a tower 102 and a nacelle 104. A rotor 106 with three rotor blades 108 and a spinner 110 is arranged on the nacelle 104. When in operation, the rotor 106 is brought to a rotating movement by the wind and thereby drives a generator in the nacelle 104.

Figure 2:
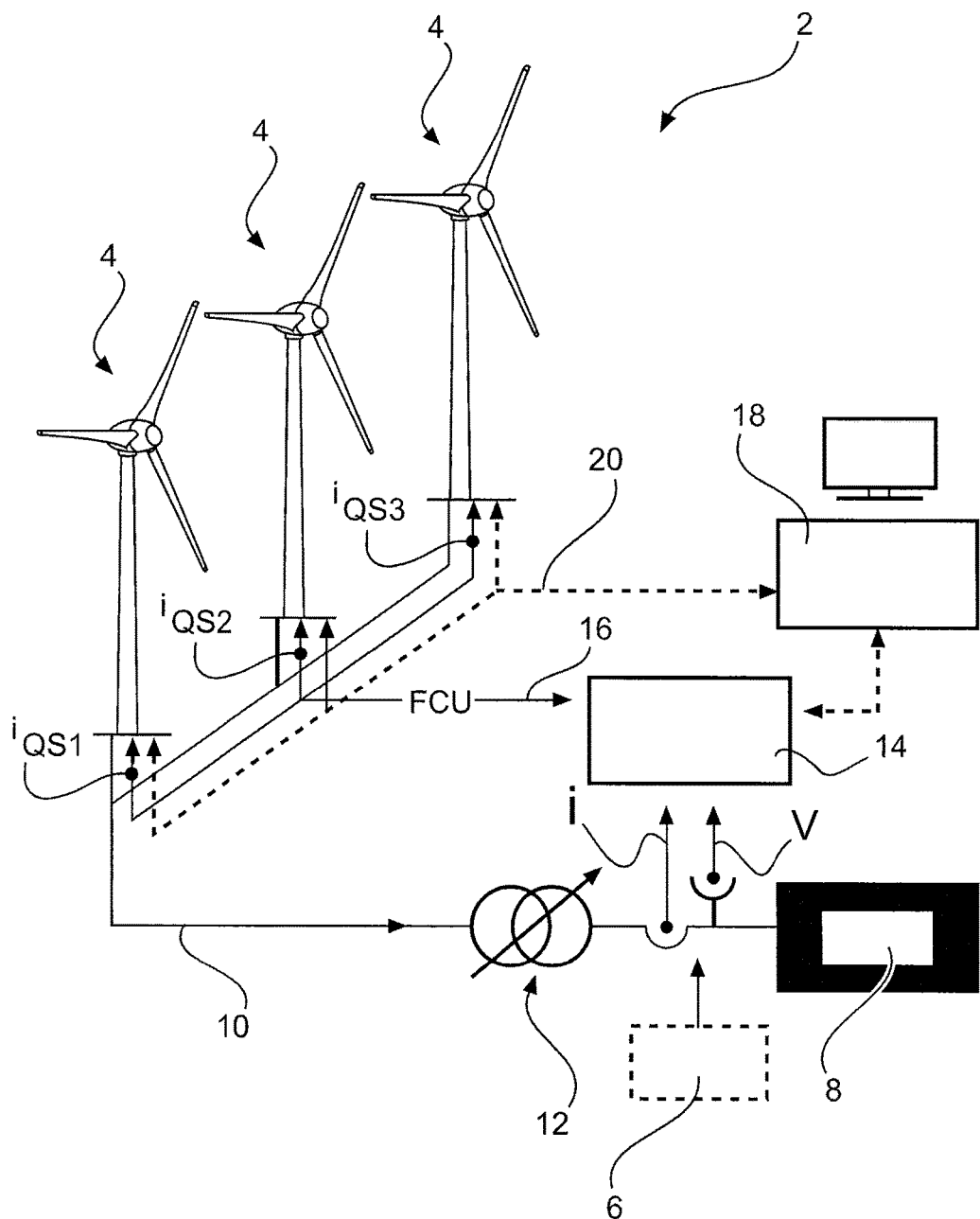
FIG. 2 shows a schematic view of a wind park that can be controlled according to the invention.

FIG. 2 shows a wind park 2 with exemplary three wind turbines 4, which feeds into an electric supply network 8—which may be also referred to simply as network—at a common network connection point 6. The wind turbines 4 generate the currents to be fed in, which are collected in a wind park network 10 and transmitted to a transformer 12. In transformer 12, the voltage in wind park network 10 is stepped up to a corresponding voltage of the supply network 8.

The fed-in actual current $I_{ist}$ and the present actual voltage $V_{ist}$ are measured at network connection point 6 and thus behind transformer 12 in the example shown, i.e., at the side facing the network 8, and are provided as measured values to a park control unit 14 for the purpose of consideration and evaluation.

Park control unit 14, also referred to as FCU, communicates with the individual wind turbines 4 via an FCU bus 16. Park control unit 14 communicates moreover with a SCADA system 18, via which the wind park and individual wind turbines can be controlled and/or monitored to some extent. Moreover, the SCADA system 18 communicates with the wind turbines via a SCADA bus 20.

According to one embodiment, it is proposed to have the measured values at network connection point 6 also evaluated by the park control unit 14 to detect a transient process in the electric supply network 8. Current measured values are then transmitted to the wind turbines 4 via FCU bus 16 as quickly as possible and at a high clock rate. This may include, in particular, the respective current voltage, which was recorded at network connection point 6. Such current measured values that are transmitted at a high clock rate may also include information on the phase angle of the fed-in current, namely the phase angle between fed-in actual current and recorded actual voltage.

In addition or alternatively, it is proposed for the park control unit 14 to transmit control values to the individual wind turbines 4 via the FCU bus 16 once a transient process has been detected in the network 8. The control values to be transmitted also at a high clock rate include, in particular, a reactive current target value $i_{QS}$. What is transmitted in particular for each of the wind turbines 4 is an individual reactive current target value $i_{Q1}$, $i_{Q2}$ or $i_{Q3}$. It is also possible to transmit values for each phase individually. This may also take place by transmitting a value along with an unbalance factor, or by transmitting a target value, e.g., a reactive current target value, both for the positive sequence and the negative sequence pursuant to the method of symmetrical components. Such target currents can be hence calculated directly from the measured values for current and voltage at the network connection point 6 in park control unit 14, with such currents being harmonized and transmitted to the respective wind turbines 4. The wind turbines 4 can then directly adjust said required reactive currents. The park control unit 14 can hence also control and thus detect early on what total current, in particular what total reactive current, will be fed in if it can be assumed that the wind turbines 4 will be able to implement the predetermined target values in the manner as prescribed.

Such a method can, in particular, also improve the fault ride through—also referred to as FRT—of the wind park 2 and demonstrate the concrete behavior of the wind park. This way, one can, in particular, also provide the necessary proof that is required for connecting the wind park 2 to the electric supply network 8. This improves, in particular, also the possibility of having the wind park certified for such a particularly critical event.

In this regard, the proposed solution departs from former situations in wind parks, where each wind turbine takes care of its own control, including FACTS control. Now, control can be performed centrally by the park control unit 14. The concrete implementation of the current to be generated in each case continues to be performed by the individual wind turbines. One of the advantages is that each individual wind turbine often was not aware of the precise voltage levels and concrete phase angle at the feed point. Preferably, measuring will be done based on a so-called space vector method at the network connection point. Such a method is described in the document U.S. 2012/0169059 and may be also referred to as network state monitoring.

When specifying the reactive power target value, one will first determine an overall reactive power target value for the entire wind park which will then be broken down into individual target values for each wind turbine at the wind park. This may be done either consistently, but it may also be done according to the number of power cabinets, namely of the feed-in units or inverter units employed, and it may be done according to the power cabinets available from time to time, wherein the park control unit 14 is provided with information on what power cabinets, i.e., inverters, are available and ready for use at that moment. One criterion to be considered may also be whether the respective wind turbine is in service at the moment in question. So far, the fault ride through (FRT) of existing wind parks took place at the level of the wind turbines instead of at the wind park level, meaning that each wind turbine performed such FRT independently for itself, which makes it also difficult to demonstrate the FRT behavior at the network connection point of a wind park. This has now been improved by the proposed solution.

Another problem with the former concepts was that the FACTS control within the individual wind turbines was not aware of how the voltage level and phase angle at the network connection point look like. It is now proposed, in particular, to transmit the voltage signals from the network connection point to the wind turbine to achieve a relative adjustment for a concrete provision of reactive current and thus for an ideal network support at the network connection point. The values may be transferred either in sinusoidal form or as already allocated values under the space vector method.

In addition or alternatively, it is proposed to determine a total reactive current amplitude target value and transmit it to the wind turbines depending on the composition of the wind park.

The invention claimed is:

1. A method for feeding electric power of a wind park including a plurality of wind turbines into an electric supply network, the method comprising the steps of:
feeding the electric power at a network connection point,
recording at least one network state parameter at the network connection point using a park control unit,
checking the supply network for a presence of a transient process, and
in response to detecting the presence of the transient process, sending, at an increased clock rate, at least one of the following to the wind turbines:
the at least one network state parameter, and
control values determined by the park control unit.

2. The method according to claim 1, wherein at least one of the following are recorded as the network state parameter at the network connection point:
an electrical voltage of the supply network,
a phase angle of at least one fed-in current,
a value of the at least one fed-in current, and
a fed-in reactive power, and
wherein a phase of the current to be fed-in is transmitted as the control values to the individual wind turbines.

3. The method according to claim 1, wherein the control values transmitted to the wind turbines are individualized for each of the wind turbines or for groups of the wind turbines of the wind park.

4. The method according to claim 3, wherein:
each of the control values provide one reactive current target value of one reactive current to be fed in,
a sum of the reactive current target values of all wind turbines provides a total reactive current target value indicating an amount of reactive current to be fed in at the network connection point, and
a respective reactive current target value of a wind turbine depends on at least one of the following:
a current feed-in capacity of the respective wind turbine, and
of the total reactive current target value of the network connection point.

5. The method according to claim 1 wherein the electric supply network is a three-phase network, and wherein the control values are sent to the wind turbines and the control values are:
different from phase to phase,
include an unbalance factor, and
specified via a positive sequence component and a negative sequence component, with the transmitted control values each specifying one reactive current target value of a reactive current to be fed in.

6. The method according to claim 1 wherein the presence of the transient process is determined to have occurred when at least one of the following occurs:
a line voltage of the supply network drops below a predetermined voltage limit,
the line voltage of the supply network exceeds a predetermined upper voltage limit,
the line voltage of the supply network changes with a time gradient that in terms of its value exceeds a modification limit, and
a difference of the line voltage of the supply network is weighted by a reference value and the time gradient of the line voltage is weighted and added up to an overall criterion, wherein the overall criterion in terms of absolute figures or value exceeds an overall limit.

7. The method according to claim 1 further comprising:
switching from a stationary to a transient control when a transient process was identified in the supply network, and
switching from a transient back to a stationary control when the transient process has ended, and
in case of a stationary control, the park control unit:
does not provide to each wind turbine default values for at least one of a reactive current to be fed in and for a phase angle to be set, and sends measured voltage values at the network connection point to the wind turbines as mean values, with a first clock rate; and in case of a transient control, the park control unit:
provides each wind turbine with default values for at least one of a reactive current to be fed in and for a phase angle to be set,
sends measured voltage values at the network connection point to the wind turbines as instantaneous values or with a second clock rate that is increased over the first clock rate, and
the wind park is controlled such that a minimum total active power to be fed in is not undercut based on a total reactive power at the network connection point fed in or to be fed in at the network connection point.

8. The method according to claim 1, wherein when the presence of the transient process is detected, the method includes notifying a network control center that controls the electric supply network.

9. The method according to claim 1 further comprising continuously measuring the at least one network state parameter at the network connection point at an undiminished first clock rate, wherein the at least one network state parameter is transmitted to the wind turbines at a second clock rate upon detection of a transient process, wherein the second clock rate corresponding to the undiminished first clock rate at which the at least one network state parameter is measured.

10. A wind park for feeding electric power into an electric supply network at a network connection point, comprising:
a plurality of wind turbines, and
a park control unit coupled to the plurality of wind turbines, wherein the park control unit performs the method according to claim 1.

11. The method according to claim 1, wherein in response to detecting the presence of the transient process, the method includes sending the at least one network state parameter and the control values at the increased clock rate to the wind turbines.

12. The method according to claim 11, wherein each wind turbine includes a plurality of feed-in units for generating current to be fed into the electric supply network, and a reactive current target value of the respective wind turbine is higher the more feed-in units the respective wind turbine includes.

13. The method according to claim 12, wherein the reactive current target value of the respective wind turbine is higher the more feed-in units the respective wind turbine has in function.

14. The method according to claim 11, wherein at least one of a reactive current target value and an active power set point is determined depending on at least one of a nominal active power and a nominal current of the respective wind turbine or is transmitted as a value standardized in respect thereto when the respective wind turbine is in operation.

* * * * *